United States Patent

Montone

[15] 3,679,820
[45] July 25, 1972

[54] MEASURING SYSTEM
[72] Inventor: Liber J. Montone, Reading, Pa.
[73] Assignee: Western Electric Company, Incorporated, New York, N.Y.
[22] Filed: Jan. 19, 1970
[21] Appl. No.: 3,628

[52] U.S. Cl. ......................................... 178/6, 178/DIG. 36
[51] Int. Cl. ........................................................ H04n 7/02
[58] Field of Search ................... 178/6, DIG. 21, DIG. 1, 68

[56] References Cited

UNITED STATES PATENTS

| | | | |
|---|---|---|---|
| 3,244,810 | 4/1966 | Williams | 178/6.8 |
| 3,390,229 | 6/1968 | Williams | 178/6 |
| 3,449,511 | 6/1969 | Hecker | 178/DIG. 1 |
| 2,774,964 | 12/1956 | Baker et al. | 178/DIG. 21 |
| 3,321,575 | 5/1967 | Lewczyk | 178/DIG. 1 |

Primary Examiner—Robert L. Griffin
Assistant Examiner—Barry Leibonitz
Attorney—W. M. Kain, R. P. Miller and R. Y. Peters

[57] ABSTRACT

Dimensional measurement of a pattern is achieved by televising the pattern and displaying the pattern on a television monitor. A special effect or measuring raster is generated and superimposed upon the pattern in such a manner that the raster overlaps at least one dimension of the pattern to be measured. By means of a suitable pulse generator and gating circuit, a series of uniformly timed pulses are produced in timed response to the coincidence of (a) the video signal of the pattern exceeding a fixed threshold value, and (b) the electronic waveform representing the special effect raster exceeding a nominal value. Periodically, the pulses produced are counted and numerical value commensurate therewith is displayed.

7 Claims, 15 Drawing Figures

PATENTED JUL 25 1972

INVENTOR
L.J. MONTONE

ATTORNEY

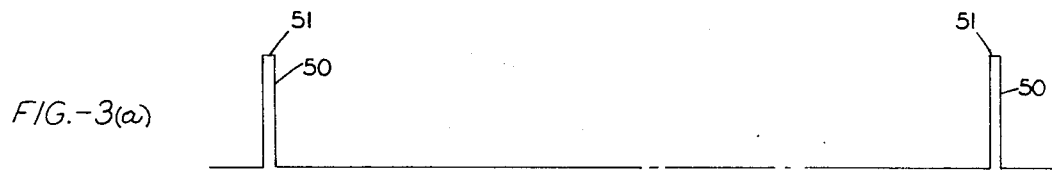
FIG.-3(a)
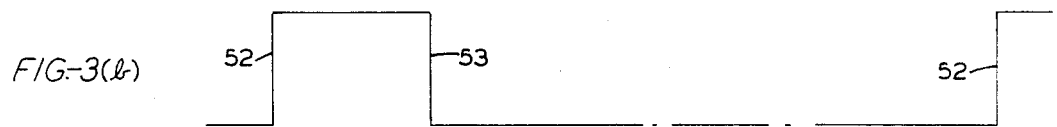
FIG.-3(b)
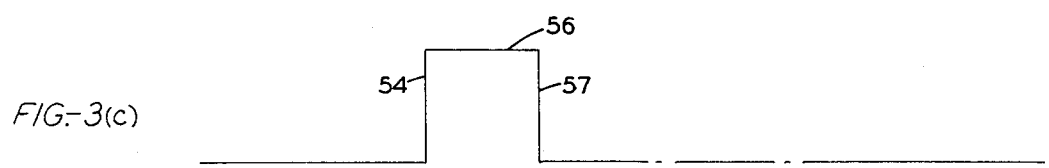
FIG.-3(c)
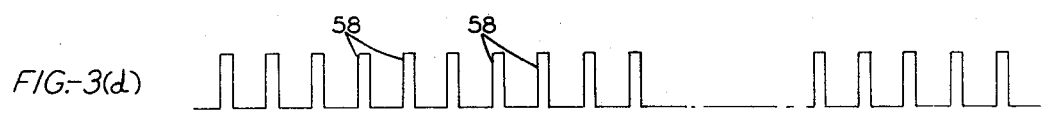
FIG.-3(d)
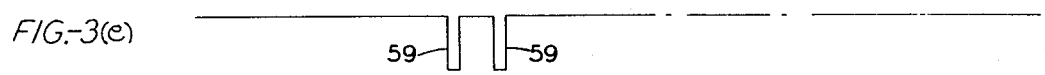
FIG.-3(e)
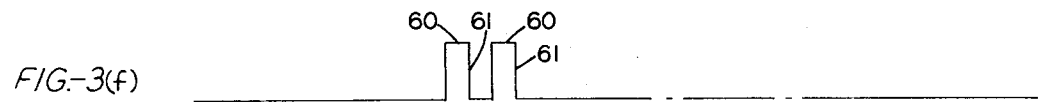
FIG.-3(f)
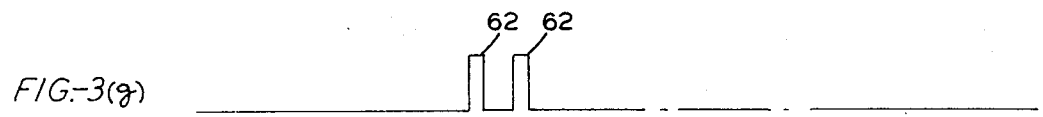
FIG.-3(g)
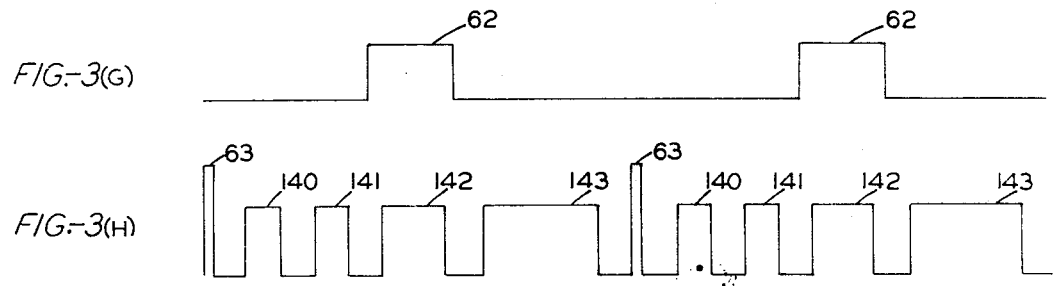
FIG.-3(G)
FIG.-3(H)
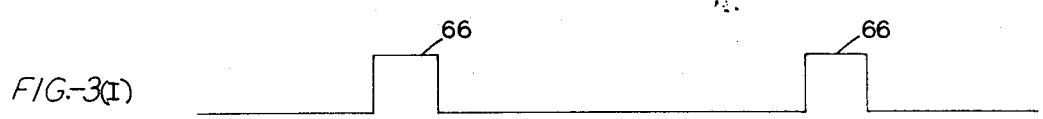
FIG.-3(I)
FIG.-3(J)

MEASURING SYSTEM

BACKGROUND OF THE INVENTION

This invention relates to the field of metrology, and in particular to the objective measurement of dimensions of microscopic geometries which are displayed on a television monitor which receives its signals from a television camera microscope. Accordingly, the general objects of the invention are to provide new and improved apparatus and methods of such character.

In the design of very small devices, such as integrated circuits and the masks used in the manufacture of these circuits, it is desirable to dimensionally measure up to hundreds of microscopic odd shaped configurations for each individual device. It is further desirable to quickly and accurately determine areas as well as linear dimensions of irregular shaped patterns of masks. Prior art techniques, in general, have been very ineffective in the low cost, quick and accurate measurement of specific geometries.

An integrated circuit, typically, may measure 0.0025 square inches, including as many as 100 individual transistors and 100 individual resistors thereon. For accurate alignment, small microscopic T-shaped marks are used on the individual masks, wherein the width of the vertical stroke of the T-shaped mark is approximately 200 microinches. Preferably, it is desirable to be able to measure to a repeatability of within 2 or 3 microinches, in order to manufacture integrated circuits efficiently on a production line basis.

A typical mask for integrated circuits includes, what appears to be, about 500 tiny dots. Each dot is a complete integrated circuit. The integrated circuits are formed from a single semiconductor wafer so that one wafer yields about 500 circuits. Each integrated circuit may include hundreds of geometries, for example, 100 transistors and 100 resistors.

As many as seven masks (each one with different details) are used in manufacture of integrated circuits. Because these masks are used as overlays, it is important that the dimensions, as well as location, of the various geometries be extremely accurate so that the masks may be superpositioned on top of each other at various stages of manufacturing operations.

Optical measurement may appear proper to the unaided eye. A pair of approximately parallel lines may appear parallel to the eye, while in fact a small taper exists. In the past, it was necessary to slowly and tediously examine an article under a microscope, align the cross-hairs, turn a micrometer wheel, and read the indicator wheel. It was difficult to find or determine the edge of a pattern with accuracy. The measurement of small dimensions, in the past, was highly subjective and inaccurate.

Thus, it is an object of this invention to provide a novel method and apparatus for quickly and objectively measuring dimensions.

A particular object of this invention is to provide a novel method and apparatus for accurately measuring linear and area dimensions of microscopic patterns.

A semiconductor target, used as a component in a television camera tube, measures one-half inch by one-half inch in surface area, and has 840,000 tiny diodes 6 microns (or 236 microinches) in width oriented along the surface area. The size of these diodes varies appreciably, more than ± 20 microinches, so that uneven shadings are apparent across the face as viewed microscopically. Hence, it is desirable to rapidly measure the 840,000 diodes on the semiconductor target. Thus, another object of this invention is to provide novel methods and apparatus for rapidly measuring the diodes of a semiconductor target.

By practicing the teachings of this invention, the subjectiveness is taken out of measurement by placing the numerical value of the measurement on a counter which can be easily read. The dimension of the pattern to be measured is converted into a series of pulses which can be counted. Two important advances are achieved: first, the subjectiveness is taken out of the measurement; second, measurements are obtained to the millionths of an inch.

In the field of medical diagnosis, a Papp Test is often used to determine the size of cells, since malignant cells are usually larger than normal. In a typical Papp Test, a glass slide is smeared with thousands of cells. A trained diagnostician carefully and meticulously visually examines the cells. Such examination of cells is difficult in marginal cases. Cells smaller than a standard may represent normal, non-malignant cells. Large readings may indicate an abnormal cell. The normal cell, however, is not standard for all people; it varies from person to person, and it may vary within the same person. It should be calibrated for each individual, by known techniques such as by obtaining a smear, a strain, or an equivalent from within the body.

Thus, another object of this invention is to provide a novel method and apparatus for accurately comparing the area measurements of similar microscopic patterns against a standard.

SUMMARY OF THE INVENTION

In accordance with one embodiment of this invention, dimensional measurement of a pattern can be performed by televising the pattern, and displaying the pattern on a television monitor. A special effect or measuring raster, generated and superimposed on the monitor, is varied so that it overlaps at least one dimension of the pattern to be measured. A series of uniformly timed pulses are produced in response to the coincidence of video information of the pattern exceeding a fixed threshold value, with the electronic waveform representing the special effect raster exceeding a nominal value. The pulses that are produced are counted during an integral number of frames.

In a preferred embodiment, the special effect raster has controllable top, bottom, left, and right margins.

In one mode, for area measurement, a special effect raster is produced so as to overlap the entire area of the pattern to be measured.

In accordance with a more specific embodiment of the invention, the special effect raster can be effectuated by coupling a vertical synchronizing signal to an input of a first variable pulse width one-shot multivibrator; coupling the output of the first multivibrator to an input of a second variable pulse width one-shot multivibrator; coupling the output of the second multivibrator to one input of an AND gate which has its second input coupled to receive a horizontal synchronization signal; coupling the output of the AND gate to an input of a third variable pulse width one-shot multivibrator; coupling the output of the third multivibrator to an input of a fourth variable pulse width one-shot multivibrator; and combining the output of the fourth multivibrator with the composite video signal and coupling the combination thereof to a cathode-ray tube.

Apparatus for dimensional measurement, in accordance with an embodiment of this invention, includes a television camera for generating a video signal of an object to be viewed together with appropriate horizontal and vertical synchronizing signals. Facilities are provided for coupling the signal from a special effect raster generator, which provides a controlled raster as to its four margins, together with the video signal generated by the television camera, through to the video electrode of a cathode-ray tube. The signals from the special effect generator and the television camera are coupled to two input terminals of an AND gate. Suitable means are coupled to the output of the AND gate for measuring the duration of the output over an integral number of frames.

In a more specific embodiment of the invention, the measuring means coupled to the output of the AND gate includes a resettable digital pulse counter. The output of the AND gate is coupled to the digital pulse counter via a pulse generator which generates a plurality of uniformly timed pulses upon application of an energizing signal to the input thereof.

BRIEF DESCRIPTION OF THE DRAWINGS

Other objects and advantages of the invention will become apparent from the following detailed description and the accompanying drawings illustrating specific embodiments thereof, in which:

FIGS. 3(a) through 3(g) and 3(G) through 3(J) constitute a set of waveforms, wherein FIGS. 3(a) through (g) are depicted on the same time scale; FIG. 3(G) corresponds to FIG. 3(g) but on a greatly enlarged time scale; and FIGS. 3(G) through (J) are each depicted on a common time scale;

GENERAL DESCRIPTION

In general, special effect, in the television field, has generally been limited to various television "tricks" other than the normal display of a simple scene. In the past, special effects have included such techniques as split screen, corner insert, superposition of one scene on another scene, the superposition of a portion of one scene onto a complete second scene, etc. As used herein the term "special effect" or measuring raster generator is to be broadly construed, and includes, by way of example and not by way of limitation, devices or means for producing a signal having a variable pattern as to top, bottom, left, and right or combinations thereof which may be positioned on any part of the display screen.

Figure 1:
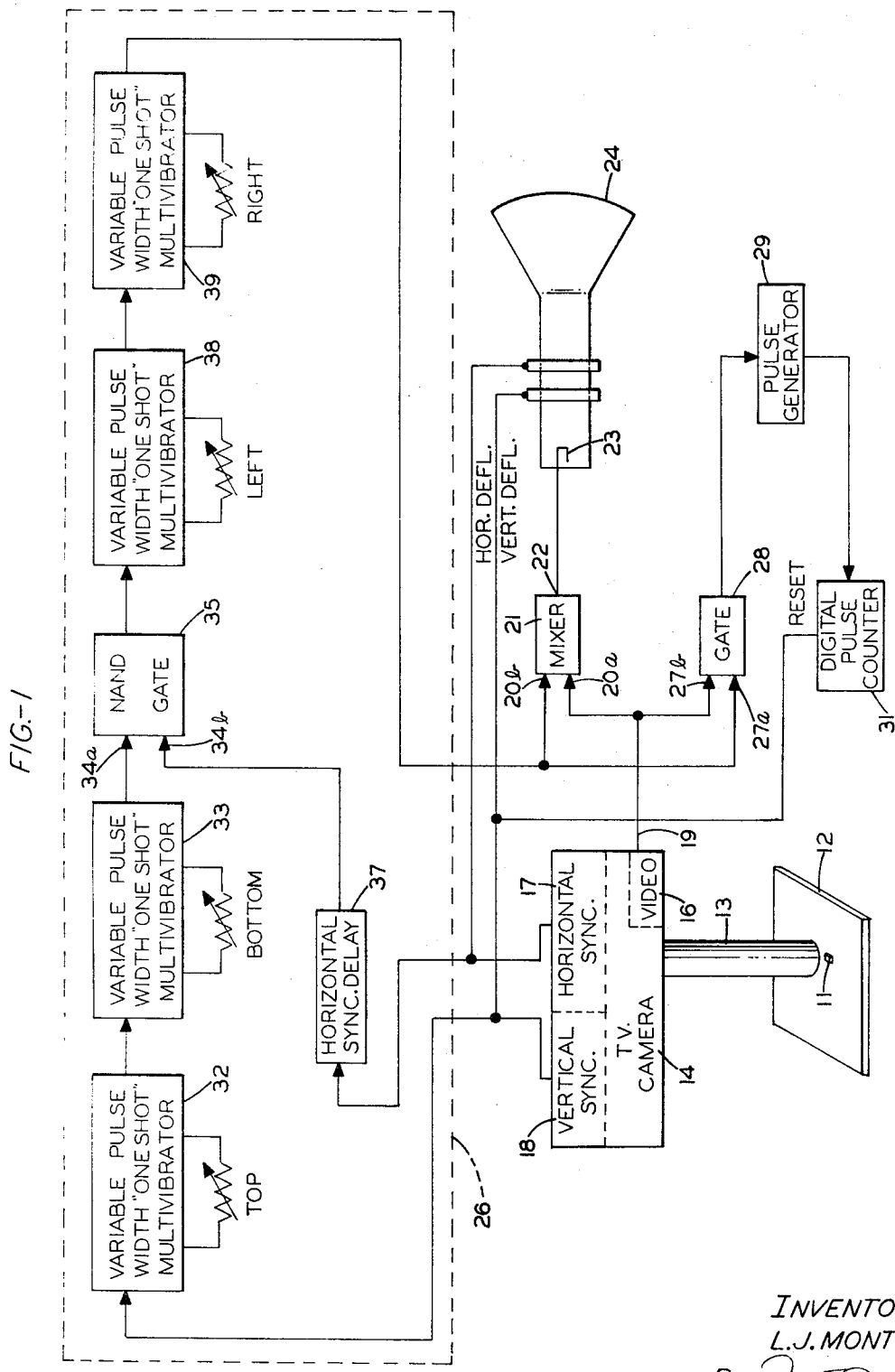
FIG. 1 is an electrical block diagram of one embodiment of this invention.
Figure 1:

Referring to FIG. 1, there is illustrated apparatus for measuring the linear and area dimensions of a shaped configuration of a microscopic article 11. As shown, the article 11 to be measured can be placed upon a table 12 or other suitable substrate. The article 11 is viewed, via a microscope 13, by a television camera 14.

The television camera 14, of a type commercially available, has video circuitry 16 together with horizontal and vertical synchronization circuits 17 and 18 associated therewith (in addition to its own power supply).

The video portion 16 of the television camera 14 is coupled, via a line 19, to one input terminal 20a of an isolating circuit, such as a mixer 21, the output terminal 22 of which is coupled to a video electrode 23 of a cathode-ray tube 24.

The horizontal and vertical synchronizing circuits 17 and 18 of the television camera 14 control a special effect raster generator 26 which is coupled to a second input terminal 20b of the mixer 21 so that the output terminal 22 of the mixer 21 provides an electrical signal including the composite video signal of the article 11 having a special effect raster superimposed thereon.

The output from the special effect raster generator 26 is coupled to one input terminal 27a of an AND gate 28 having its other input terminal 27b coupled to the line 19 to receive the video signal of the article 11. The output from the AND gate 28, when "on", is coupled to initiate the generation of a train of uniformly timed pulses from a variable frequency pulse generator 29. The variable frequency pulse generator 29 is coupled to a digital pulse counter 31.

The digital pulse counter 31 displays the total count of the pulses coupled thereto by the pulse generator 29. The counter 31 is periodically reset at frequent intervals, such as, for example, every given integral number of frames of video information scanned by the camera 14.

The Special Effect Raster

The special effect raster, in one form of operation, may be a brighter than background rectangular pattern, controllable in its four dimensions as to top, bottom, left, and right boundaries as to its placement on the cathode-ray tube 24. Alternatively, if desired, the raster may be adjusted so that it appears darker than background.

The special effect raster generator 26, in one embodiment, as shown in FIG. 1 includes two variable pulse width one-shot multivibrators 32 and 33 serially connected from the vertical synchronization circuit 18 of the television camera 14 to an input 34a of a NAND gate 35, having a second input 34b thereof controlled by the output of the horizontal synchronizing circuit 17. In a particular embodiment, a horizontal sync delay circuit 37 is inserted between the horizontal synchronizing circuit 17 and the NAND-gate 35 to provide for better stabilization.

The output of the NAND-gate 35 is coupled through two additional serially connected variable pulse width one-shot multivibrators 38 and 39 to provide the output for the special effect raster generator 26 to the mixer 21 and the gate 28.

The variable pulse width one-shot multivibrators 32, 33, 38 and 39 used to generate the special effect raster are standard multivibrators in that each of them produces an output upon the initiation of a trailing edge of an input signal applied thereto. A one-shot multivibrator, also known as a monostable multivibrator or as a delay flop, is characterized by the fact that it produces a pulse upon the application of an input signal. In the particular instance described, the output pulse width from the multivibrator can vary by adjusting a rheostat. It is desirable that the multivibrators described herein be adjustable from a few microseconds to a few milliseconds, so that the special effect raster on a frame of video information can be varied in every dimension. The timing is somewhat critical since one frame of video information, as used in commercial television systems, has a 1/30 second duration. Also, there are 525 lines per frame. Thus, it is easily calculated that each line of video information occurs in 1/15,750 second. Expressed another way, each line of video information occurs at approximately 63.5 microseconds.

The Pulse Counting Circuits

The output of the special effect raster generator 26 and the video signal from the television camera 14 (after suitable shaping) are coupled through the AND gate 28, which provides only the pulse or pulses that are desired to be measured in terms of pulse width.

As illustrated in FIG. 1, the apparatus is adapted to count or measure the width or area of a particular shaped configuration, as desired.

Operation

Figure 2:
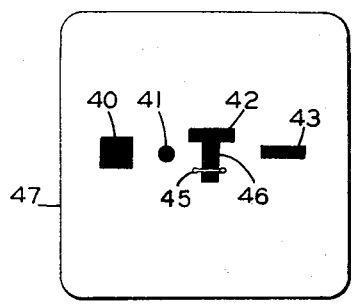
FIG. 2 is a display of patterns on the face of a cathode-ray tube, such display being shown to illustrate the principles of this invention.

Referring to FIG. 2, there are shown, for example, several patterns on the surface of an article, including a square 40, a circle 41, a letter T 42, and a rectangular bar 43.

Assume it is desired to accurately measure the width of the vertical structure 46 of the T 42. This can be achieved as follows:

Place the article 11 under consideration within the field of view of the television camera 14 so that the pattern appears on the television screen 47 of the cathode-ray tube 24 as shown in FIG. 2. Next, the special effect raster generator 26 (FIG. 1) is adjusted so that the leftmost margin of a special effect raster 45 appears just to the left of the vertical structure 46 of the T 42 and the righthand margin appears just to the right of the vertical structure 46 of the T 42.

In one embodiment, a total of two horizontal lines, desirably, are scanned so as to self-average the width of the vertical structure 46 at the location being measured.

Referring to FIG. 3 there is shown a series of waveforms (a) through (g), along a common time scale, and a series of waveforms (G) through (J), along an expanded time scale. The waveform at (a) illustrates a waveform of vertical synchronizing pulses from the circuit 18. The vertical synchronizing pulses occur once every one-sixtieth second and are of short duration. The trailing edge 50 of a vertical synchronizing pulse 51 causes the first one-shot multivibrator 32 to be activated and, as shown in FIG. 3(b), the waveform of the first one-shot multivibrator becomes positive going, at 52, substantially with the trailing edge 50 of the vertical synchronizing pulse 51. The first one-shot multivibrator 32 remains positive for a time period corresponding to the setting of its variable control. At the conclusion of the time period, the voltage level of the first multivibrator 32 drops at 53 to its original level, and remains there until, at a subsequent frame, the trailing edge of the subsequent vertical synchronizing pulse reactivates the multivibrator 32.

The trailing edge 53 of the pulse generated by the first one-shot multivibrator 32 causes the second one-shot multivibrator to be energized, and, hence, as shown in FIG. 3(c) the output of the second one-shot multivibrator 33 increases at 54 to a positive level 56 and remains there for a period of time determined by the setting of the variable control of the second one-shot multivibrator 33. The waveform then trails at 57 back to its base level and remains there until the subsequent frame.

FIG. 3(d) illustrates a series of horizontal synchronizing pulses 58—58 from the horizontal sync delay circuit 37. As depicted, a limited number are shown. However, a total of 525 horizontal pulses are normally present during every two vertical synchronizing pulses, as is true in commercial television systems. FIG. 3(e) illustrates two negative pulses 59—59 from NAND gate 35 which coincide in time with those two horizontal synchronizing pulses 58—58 which occur during the duration of a positive output level 56 from the second one-shot multivibrator 33. Hence, by the appropriate setting of the controls for the first and second one-shot multivibrators 32 and 33 the top and bottom boundaries of the special effect raster 45 are determined, or expressed another way, the top boundary of the special effect raster is determined together with the number of horizontal lines to be scanned.

The negative going pulses 59—59 from the output of the NAND-gate 35 initiate output signals of positive pulses 60—60 from the third one-shot multivibrator 38. The duration of these output signals can be varied by a control of the third multivibrator 38.

The output of the third one-shot multivibrator 38 is coupled to the fourth one-shot multivibrator 39 so that the trailing edge 61 of the output signal 60 from the third one-shot multivibrator 38 initiates the actuation of the fourth one-shot multivibrator 39, see FIGS. 3(f) and 3(g). The duration of the pulse 62 generated by the fourth one-shot multivibrator 39 is variable so as to adjust the rightmost boundary. Thus, FIG. 3(g) illustrates two pulses, designating the boundary of the special effect raster 45 that is generated, per frame.

FIG. 3(G) is identical to FIG. 3(g) except that is is greatly expanded due to the stretching of the time scale.

FIG. 3(H) is a composite video signal of the two complete horizontal lines under consideration. The composite video signal includes two horizontal synchronizing pulses 63—63 together with video information for those two lines including pulses 140, 141, 142 and 143, representing portions of the square 40, circle 41, T 42, and rectangle 43, respectively, shown in FIG. 2.

The output of the AND gate 28 produces pulses 66—66 as shown in FIG. 3(I), which corresponds in time, solely to the width of the vertical structure 46 of the T 42 under consideration.

The output pulse 66 of the gate 28 is coupled to the pulse generator 29 which produces high frequency pulses 67—67 for the duration of the pulse 66 applied thereto. These pulses 67—67 are then directed to the digital pulse counter 31 which counts the pulses 67—67. As viewed in FIG. 3(J), there is shown a plurality of pulses 67—67 which occur during the time intervals of each of the positive pulses 66—66 of FIG. 3(I). The pulses 67—67, counted by the digital pulse counter 31, are indicative of the width of the vertical structure 46 of the T 42.

Figure 4:
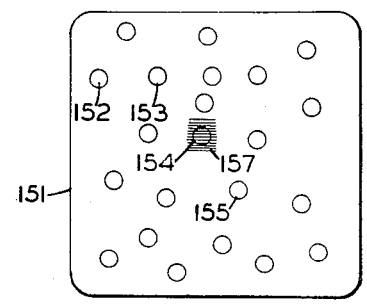
FIG. 4 is a display of circular configurations displayed on the face of a cathode-ray tube, such display being shown to illustrate other principles of the invention.

Referring to FIG. 4, there is shown a television monitor representation 151 of a plurality of circular configurations 152, 153, 154 and 155. The circular configurations 152—155 may be fixed circular dots, as diodes on a target slice used in a television camera tube. Alternatively, the dots may include such generally circularly spaced configurations as living tissue cells, such as blood cells and the like, wherein it may be desired to measure the area of the cells to determine their morbidity.

As shown in FIG. 4, the circular configuration 154 to be measured for its area is entirely encompassed by a special effect raster 157 to completely cover its top, bottom, left, and right margins without, however, overlapping any adjacent configurations. The area of the circular configuration 154 is read directly from the digital pulse counter 31 after applying a factor for the dimension to pulse ratio thereto.

For ease in measurement, it is desirable that the dimension to pulse ratio be a convenient multiple that an operator can use. Ideally, a one to one relationship is preferred. For example, for measuring the width of a vertical structure of the T (which is a common practice within the manufacture of integrated circuits), the width of such a T may normally be in the neighborhood of 240 microinches. Hence, it is desirable that the counter be directly translatable into microinches so that the counter itself reads 240. This can be adjusted by using an appropriate pulse source having a frequency of such a value which, together with the magnifying capability of the television microscopic optics, produces a multiplication factor of one to one.

Calibration is performed by varying the frequency of the pulse generator. If a standard length is known to be 50 microinches, the frequency of the pulse generator can be varied so that the counter reads 50.

To calibrate, a known standard of similar geometry to the pattern to be measured is used. Thus, if it is desired to measure the area of a circle, then a circle of known size is used for calibration. Desirably, if a rectangle is to be measured, then a standard rectangle would be used for calibration. No difference in measuring the area of a rectangle was observed when the rectangle was scanned along its length compared with scanning along its width, with rectangles having aspect ratios less than 10:1.

A random interlace is desired. This occurs as a normal wobble in the 60 cycle line, causing the lines to constantly move. Effectively, random interlacing is caused by letting the vertical oscillation freely run, letting the inherent variables within take over. Thus, a line would normally wobble the distance between two lines. A commercial television camera has both random interlace and odd-even interlace settings. With random interlace, the scanned lines are not precisely placed on the screen. In a sense, an odd-even random interlace takes place. The action is not precisely fixed; a raking or combing action is obtained. This is very desirable because the lines are not in the same place and one can see underneath them. Such random odd-even interlace action can be established within a commercially available television camera without modification.

The digital pulse counter is reset periodically, preferably every integral number of fields or frames of video information. For example, by resetting every one-tenth second or every full second, each measurement, in effect, is read 6 or 60 times, respectively, yielding a cumulative average which statistically works well by providing greater accuracy in measurement. Ideally, the counter is reset every 10 frames of video information, so that, to read the counter, the observer merely disregards the last digit (i.e., divides by ten).

Various modifications will be apparent to those skilled in the art without departing from the spirit and scope of this invention. For example, although horizontal and vertical deflection yokes are depicted in conjunction with the cathode-ray tube 24, it is obvious that electrostatic deflection plates can be used in lieu thereof. Furthermore, although a microscope 13 is depicted in the drawings as being the preferred mode of practicing this invention, it is not absolutely necessary to the practice thereof. Also, it will be apparent to those skilled in the art that in lieu of monochromatic tube and a mixer as shown in FIG. 1, a multi-grid, polychromatic cathode-ray tube can be used in which the mixing takes place within such a polychromatic tube. It is intended that this invention be construed broadly to include such variations as mixing within a tube itself.

A special effect raster generating means is illustrated generally in FIG. 1, it being understood, of course, that many performance limiting modifications are possible including transposition of one multivibrator for another so that the four multivibrators need not necessarily control the top, bottom, left, and right, respectively.

Figure 5:
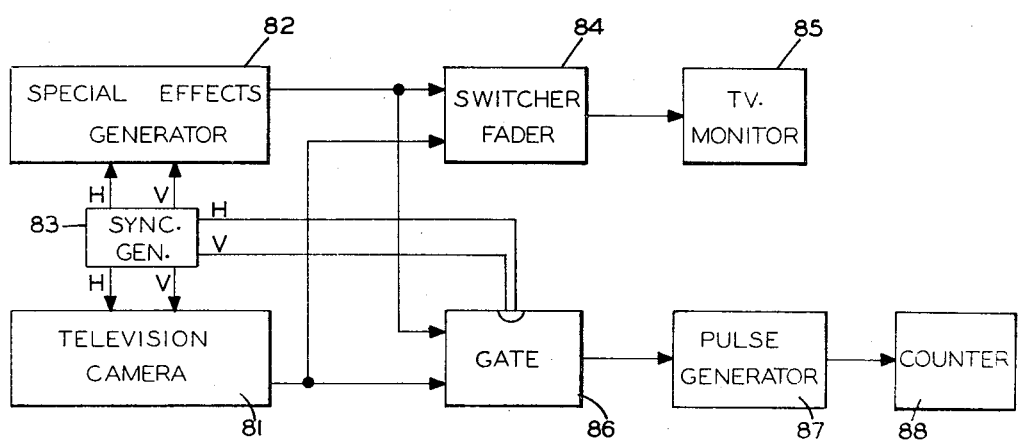
FIG. 5 is a block diagram of alternative circuits for carrying out some of the teachings of this invention.

Still another modification which sacrifices raster mobility that will become apparent to those skilled in the art, without departing from the spirit and scope of this invention, is a circuit as shown in FIG. 5 including a plurality of commercially available components: A standard television camera 81 and a special effects generator 82 (such as Model SE-101-3S sold by Shibaden Corporation of America) are coupled together, with a common horizontal and vertical synchronizing source 83, to a switcher-fader 84 (such as Model VM-104 sold by Shibaden Corporation of America) to a standard television monitor 85.

The outputs of the television camera 81 and special effect generator 82, together with the H and V outputs of the synchronizing source 83, are coupled to a gate 86 which provides an output only when there is a coincidence of enabling outputs from the camera 81 and generator 82 together with an absence of sync pulses from the synchronizing source 83. As before, the output of the gate 86 initiates the generation of high frequency pulses from the pulse generator 87 which are counted by the counter 88.

It is contemplated that this invention be construed broadly, as many variants, within the scope of this invention, will suggest themselves to those in the art.

What is claimed is:

1. A method of dimensional measurement of a pattern, comprising:
    televising said pattern to produce a video signal thereof, and displaying said pattern on a television monitor;
    generating an electronic waveform representing a measuring raster, and superimposing said raster on said monitor;
    varying the waveform so that said raster overlaps at least one dimension of the pattern to be measured;
    producing a series of uniformly timed pulses in response to the coincidence of (a) the video signal of said pattern exceeding a fixed threshold value and (b) the electronic waveform representing the raster exceeding a nominal value, said uniformly timed pulses occurring at a frequency substantially greater than the frequency of the horizontal sweep; and
    counting the number of pulses produced during an integral number of frames, said integral number being greater than one, to indicate the dimensional measurement of the pattern.

2. A method of measuring the linear dimension of a shaped configuration comprising:
    televising the configuration to produce a composite video signal in accordance therewith, and displaying a replica of said configuration on a cathode-ray tube;
    generating a variable signal representing a measuring raster, in synchronism with said video signal, for superposition with the displayed configuration on said cathode-ray tube, said raster having controllable top, bottom, left, and right margins with at least two horizontal lines between the top and bottom margins;
    adjusting the variable signal so that said raster overlaps at least one dimension of the configuration to be measured;
    producing a series of uniformly timed pulses in response to the coincidence of
    a. said video signal exceeding a fixed threshold value, with
    b. the variable signal exceeding a minimal value, said uniformly timed pulses occurring at a frequency substantially greater than the frequency of the horizontal sweep; and
    counting the number of pulses produced during an integral number of frames to indicate the dimensional measurement of the pattern.

3. The method as recited in claim 2 wherein said measuring raster for superposition on said cathode-ray tube is generated by:
    coupling a vertical synchronization signal, which is characterized by a waveform having a leading edge which goes from a first level to a second level and a trailing edge which goes back from said second level to said first level, to a first variable pulse width one-shot multi-vibrator which is activated by the trailing edge of a signal applied to an input thereof, the duration of the pulse produced by said first multivibrator being variable so as to determine the topmost boundary of the raster;
    coupling an output from said first variable pulse width one-shot multivibrator to a second pulse width one-shot multivibrator which is adapted to be activated by the trailing edge of a signal applied to an input thereof, said second one-shot multivibrator being variable so as to determine the bottom boundary of the raster;
    coupling an output from said second variable pulse width one-shot multivibrator to one input of an AND gate having a second input coupled to receive a horizontal synchronization signal so that the output of the AND gate provides synchronized pulses indicative of the horizontal lines of the raster to be produced, which pulses occur, in synchronized fashion, at the beginning of each desired line of raster to be generated;
    coupling an output from said AND gate to a third variable pulse with one-shot multivibrator which is activated by the trailing edge of a signal applied to an input thereof, the third multivibrator having a pulse duration which is variable so as to determine the left-hand margin of the raster;
    coupling an output from said third multivibrator to an input of a fourth variable pulse width one-shot multivibrator which is activated by the trailing edge of a signal applied to an input thereof, the fourth multivibrator being variable so as to determine the right-hand margin of the raster; and
    combining an output from said fourth multivibrator with the composite video signal and coupling the combination thereof to the cathode-ray tube.

4. A method of measuring the area of a shaped configuration comprising:
    televising the shaped configuration to produce a video signal thereof and displaying the pattern on a cathode-ray tube;
    generating a variable signal representing a measuring raster and displaying said raster on said tube;
    adjusting the variable signal so that the raster completely overlaps the configuration to be measured;
    producing a series of uniformly timed pulses in response to the coincidence of
    a. the video signal of the configuration exceeding a fixed threshold value with
    b. the variable signal representing the raster exceeding a nominal value;
    said uniformly timed pulses occurring at a frequency substantially greater than the frequency of the horizontal sweep; and
    counting the number of pulses produced during an integral number of frames to indicate the area of the configuration.

5. Apparatus for dimensional measurement of a pattern, comprising:
    means for televising said pattern to produce a video signal thereof, and displaying said pattern on a television monitor;
    means for generating a variable signal representing a measuring raster, and superimposing said raster on said pattern of said monitor;
    means for adjusting the variable signal so that said raster overlaps at least one dimension of the pattern to be measured;
    means for producing a series of uniformly timed pulses in response to the coincidence of (a) the video signal of said pattern exceeding a fixed threshold value and (b) the variable signal representing the raster exceeding a nominal value, said uniformly timed pulses occurring at a frequency substantially greater than the frequency of the horizontal sweep; and means for counting the number of pulses produced during an integral number of frames, said integral number being greater than one, to indicate the dimensional measurement of the pattern.

6. Apparatus for dimensional measurement, comprising:

a television camera for generating a video signal of an object to be viewed together with appropriate horizontal and vertical synchronizing signals;

a cathode-ray tube having horizontal and vertical deflection means associated therewith, and having a video electrode;

means, synchronized with said horizontal and vertical signals, for generating a measuring raster signal to provide a raster controlled as to top, bottom, left, and right margins with two or more horizontal lines between the top and bottom margins;

means for coupling the signal from said raster generating means together with the video signal generated by said television camera through the video electrode of said cathode-ray tube;

an AND gate having a first input terminal, a second input terminal, and an output terminal;

means for coupling the horizontal and vertical synchronizing signals from said television camera to the horizontal and vertical deflection means associated with said cathode-ray tube;

means for coupling the signal from said raster generating means together with the video signal from said television camera to input terminals of said AND gate;

means, coupled to said output terminal, for generating a plurality of pulses when a signal is present on said output terminal, said pulses occurring at a frequency substantially greater than the frequency of the horizontal synchronizing signals; and means for counting the number of pulses to indicate a dimension of the object.

7. The apparatus as recited in claim 6 wherein said counting means comprises:

a digital pulse counter; and means for resetting the digital pulse counter after a predetermined integral number, greater than one, of vertical synchronization signals from said television camera.

* * * * *